(12) United States Patent
Ho et al.

(10) Patent No.: US 8,108,697 B2
(45) Date of Patent: Jan. 31, 2012

(54) CONTROLLING THE POWER UTILIZATION OF A COMPUTER SYSTEM BY ADJUSTING A COOLING FAN SPEED

(75) Inventors: Stephen Ho, Fremont, CA (US); Kenny C. Gross, San Diego, CA (US); Kalyanaraman Vaidyanathan, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 747 days.

(21) Appl. No.: 12/181,121

(22) Filed: Jul. 28, 2008

(65) Prior Publication Data

US 2010/0023787 A1   Jan. 28, 2010

(51) Int. Cl.
 *G06F 1/00* (2006.01)
(52) U.S. Cl. ........................................... 713/300
(58) Field of Classification Search .................. 713/300
 See application file for complete search history.

(56) References Cited

U.S. PATENT DOCUMENTS

| | | | |
|---|---|---|---|
| 6,029,199 A * | 2/2000 | Allen et al. .................... 709/224 |
| 6,349,385 B1 * | 2/2002 | Kaminski et al. .............. 713/300 |
| 7,020,802 B2 * | 3/2006 | Gross et al. ..................... 714/39 |
| 7,245,099 B2 * | 7/2007 | Yamamoto et al. ............ 318/471 |
| 2003/0126473 A1 * | 7/2003 | Maciorowski et al. ........ 713/300 |
| 2006/0010330 A1 * | 1/2006 | Wu et al. ........................ 713/300 |
| 2006/0095796 A1 * | 5/2006 | Chotoku et al. ............... 713/300 |
| 2007/0124574 A1 * | 5/2007 | Goldberg ....................... 713/100 |
| 2008/0282117 A1 * | 11/2008 | Partani et al. ................... 714/48 |
| 2009/0132845 A1 * | 5/2009 | Hsieh et al. .................... 713/340 |
| 2009/0271049 A1 * | 10/2009 | Kinney et al. ................. 700/300 |
| 2010/0318818 A1 * | 12/2010 | Mangione-Smith .......... 713/300 |

\* cited by examiner

*Primary Examiner* — Mark Connolly
(74) *Attorney, Agent, or Firm* — Park, Vaughan, Fleming & Dowler LLP

(57) ABSTRACT

Some embodiments of the present invention provide a system that controls a power utilization of a computer system by adjusting a cooling fan speed. During operation, a relationship between information related to the cooling fan speed and the power utilization is determined. Then, the cooling fan speed is adjusted based on the determined relationship to control the power utilization of the computer system.

20 Claims, 2 Drawing Sheets

US 8,108,697 B2

CONTROLLING THE POWER UTILIZATION OF A COMPUTER SYSTEM BY ADJUSTING A COOLING FAN SPEED

BACKGROUND

1. Field

The present invention relates to techniques for managing the performance of a computer system. More specifically, the present invention relates to a method and apparatus for controlling the power utilization of a computer system by adjusting a cooling fan speed.

2. Related Art

Some computer system manufacturers are working to increase the electrical efficiency of their computer systems, and cooling fans can be one source of inefficiency. Typically, cooling fan controllers for computer systems are set to have a high nominal fan speed so that there is adequate thermal margin, even for a computer system running at full load and at altitudes as high as 10,000 feet above sea level, where the air is thinner and less effective at cooling. Therefore, for computer systems operating in less extreme conditions, fans may be running at higher speeds than required to adequately cool the processor. Reducing the nominal cooling fan speed may reduce the power used by the cooling fan, but the lower fan speed may also cause an increase in the temperature of chips in the computer system which can result in increasing power consumption by increasing the leakage current.

Hence, what is needed is a method and system that controls the power utilization of a computer system by adjusting a cooling fan speed, without the above-described problems.

SUMMARY

Some embodiments of the present invention provide a system that controls a power utilization of a computer system by adjusting a cooling fan speed. During operation, a relationship between information related to the cooling fan speed and the power utilization is determined. Then, the cooling fan speed is adjusted based on the determined relationship to control the power utilization of the computer system.

In some embodiments, adjusting the cooling fan speed based on the determined relationship includes maintaining a constant cooling fan speed when the determined relationship is within a predetermined range.

In some embodiments, adjusting the cooling fan speed based on the determined relationship includes using a gradient descent technique to determine how to optimize the cooling fan speed.

In some embodiments, determining the relationship between the information related to the cooling fan speed and the power utilization includes estimating a power utilization of the computer system by inferring the power utilization from instrumentation signals.

In some embodiments, inferring the power utilization from instrumentation signals includes inferring the power utilization from an inferential power model generated during a training phase.

In some embodiments, determining the relationship between the information related to the cooling fan speed and the power utilization includes generating a dynamic trace of power utilization for the computer system based on dynamic traces of currents and associated voltages for individual components within the computer system.

Some embodiments additionally include measuring a temperature of a component in the computer system, and adjusting the cooling fan speed based on the temperature of the component in relation to a predetermined temperature.

In some embodiments, a load on a processor in the computer system is constant.

In some embodiments, determining the relationship between the information related to the cooling fan speed and the power utilization includes systematically monitoring and recording a set of performance parameters of the computer system, wherein the recording process keeps track of the temporal relationships between events in different performance parameters.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
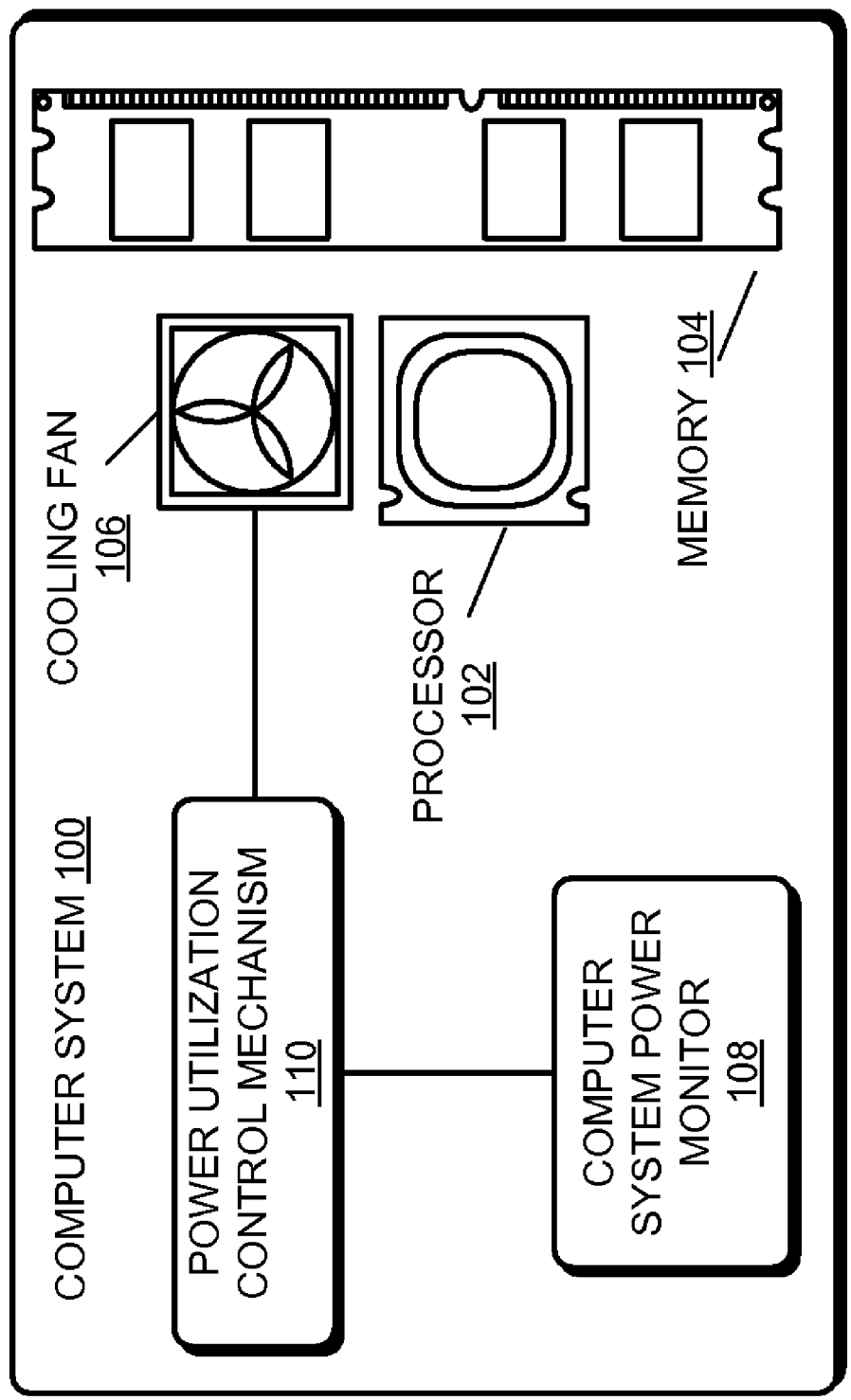
FIG. 1 represents a system that controls a power utilization of a computer system by adjusting a cooling fan speed in accordance with some embodiments of the present invention.

FIG. 1 represents a system that controls a power utilization of a computer system by adjusting a cooling fan speed in accordance with some embodiments of the present invention. Computer system 100 includes processor 102, memory 104, cooling fan 106, computer system power monitor 108, and power utilization control mechanism 110. Power utilization control mechanism 110 is coupled to cooling fan 106 and computer system power monitor 108.

Computer system 100 can include but is not limited to a server, a server blade, a data center server, an enterprise computer, a field-replaceable unit (FRU) that includes a processor, or any other computation system that includes one or more processors and one or more cores in each processor.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores.

Memory 104 can include any type of memory, including but not limited to, dynamic random access memory (DRAM), static random access memory (SRAM), and any other type of memory now known or later developed.

Cooling fan 106 is thermally coupled to processor 102, and memory 104, and can include any type of cooling fan that can be used to cool processor 102 and memory 104. Cooling fan 106 can be implemented in any technology now known or later developed. In some embodiments, cooling fan 106 also cools other devices in computer system 100 including but not limited to any other chip or integrated circuit in computer system 100. In some embodiments, cooling fan 106 is replaced by multiple cooling fans to cool one or more processors, memory chips and/or other integrated circuits in computer system 100.

Computer system power monitor 108 can be any device that can determine the power usage of computer system 100 and transmit information related to the power usage of computer system 100 to power utilization control mechanism 110. Computer system power monitor 108 can be implemented in any combination of hardware and software. In some embodiments, computer system power monitor 108 operates on processor 102. In other embodiments, computer system power monitor 108 operates on one or more service processors. In still other embodiments, computer system power monitor 108 is located outside of computer system 100. In some embodiments, computer system power monitor 108 operates on a separate computer system. In some embodiments, computer system power monitor 108 includes an apparatus or implements a method described in one or more of: U.S. Pat. No. 7,197,411, entitled "Real-Time Power Harness," by Kenny C. Gross, Kalyanaraman Vaidyanathan, Aleksey M. Urmanov, Keith A. Whisnant, and Steven F. Zwinger, issued on 27 Mar. 2007, which is hereby fully incorporated by reference; U.S. patent application entitled "Inferential Power Monitor without Voltage/Current Transducers," by Kenny C. Gross, Kalyanaraman Vaidyanathan, and Ramakrishna C. Dhanekula, application Ser. No. 11/205,924, filed 17 Aug. 2005, which is hereby fully incorporated by reference; and U.S. patent application entitled "Estimating a Power Utilization of a Computer System," by Andrew J. Lewis, Kalyanaraman Vaidyanathan, and Kenny C. Gross, application Ser. No. 12/109,112, filed 24 Apr. 2008, which is hereby fully incorporated by reference.

Power utilization control mechanism 110 can be any mechanism that can receive a signal from computer system power monitor 108 related to the power usage of computer system 100, and control cooling fan 106 in accordance with embodiments of the present invention. Power utilization control mechanism 110 can be implemented in any combination of hardware and software. In some embodiments, power utilization control mechanism 110 operates on processor 102. In some embodiments, power utilization control mechanism 110 is located outside of computer system 100. In some embodiments, power utilization control mechanism 110 operates on one or more service processors. In some embodiments, power utilization control mechanism 110 operates on a separate computer system.

Some embodiments of the present invention operate as follows. Power utilization control mechanism 110 receives information from computer system power monitor 108 related to the power usage of computer system 100, and information from cooling fan 106 related to the speed of cooling fan 106. In some embodiments, the information received by power utilization control mechanism 110 related to the speed of cooling fan 106 can include but is not limited to a current drawn by cooling fan 106, a power used by cooling fan 106, a speed (revolutions per minute) of cooling fan 106, a fan pulse width modulation percentage of cooling fan 106, or any other parameter of cooling fan 106 related to the speed of cooling fan 106. In some embodiments, the information received by power utilization control mechanism 110 related to the speed of cooling fan 106 can include information received from a computer system performance parameter monitor that can include but is not limited to an apparatus and/or method for monitoring and recording computer system performance parameters as set forth in U.S. Pat. No. 7,020,802, entitled "Method and Apparatus for Monitoring and Recording Computer System Performance Parameters," by Kenny C. Gross and Larry G. Votta, Jr., issued on 28 Mar. 2006, which is hereby fully incorporated by reference.

Power utilization control mechanism 110 then decreases the speed of cooling fan 106 by, for example, sending a control signal to cooling fan 106 to reduce the speed of cooling fan 106 by a small predetermined amount. Power utilization control mechanism 110 then determines the relationship between the power used by computer system 100 and the speed of cooling fan 106. In some embodiments, the relationship between the power used by computer system 100 and the speed of cooling fan 106 determined by power utilization control mechanism 110 can include but is not limited to a first derivative of the power used by computer system 100 with respect to the speed of cooling fan 106, and/or a second derivative of the power used by computer system 100 with respect to the speed of cooling fan 106.

In some embodiments, power utilization control mechanism 110 continues to reduce the speed of cooling fan 106 by a small predetermined amount and determines the relationship between the power used by computer system 100 and the speed of cooling fan 106 until the relationship reaches a predetermined state. In some embodiments, power utilization control mechanism 110 continues to reduce the speed of cooling fan 106 by a small predetermined amount until the first derivative of the power utilization of computer system 100 with respect to the speed of cooling fan 106 is less than a predetermined level or within a predetermined range. In some embodiments, the predetermined range for the first derivative can include but is not limited to a predetermined range near zero. In some embodiments, power utilization control mechanism 110 continues to reduce the speed of cooling fan 106 by a small predetermined amount until the second derivative of the power utilization of computer system 100 with respect to the speed of cooling fan 106 is less than a predetermined level or within a predetermined range. In some embodiments, the predetermined range for the second derivative can include but is not limited to a predetermined range near zero.

In some embodiments, power utilization control mechanism 110 changes the speed of cooling fan 106 by small predetermined amounts until an optimum speed for cooling fan 106 is reached that minimizes the power usage of computer system 100 as determined by computer system power monitor 108. In some embodiments, the power used by cooling fan 106 is related to the square of the speed of cooling fan 106, while the power usage due to leakage current vs. temperature for transistors in computer system 100 is exponential. In order to find the minimum power usage, power utilization control mechanism 110 changes the speed of cooling fan 106 by small predetermined amounts based on the change in power usage of computer system 100 as the speed of cooling fan 106 changes. The minimum power usage balances the quadratic increase in power usage vs. speed for cooling fan 106, and the exponential increase in transistor power usage vs. temperature for transistors in computer system 100.

For example, in some embodiments, if the speed of cooling fan 106 is above the optimum speed, then the power usage of computer system 100 may be reduced as the speed of cooling fan 106 is reduced. However, if the speed of cooling fan 106 is reduced below the optimum speed, then the increase in power usage due to leakage current in transistors in computer system 100 may exceed the power saved due to reducing the speed of cooling fan 106, causing the power usage of computer system 100 to increase. When the speed of cooling fan 106 is below the optimum speed, increasing the speed of cooling fan 106 may decrease the power usage due to leakage current in transistors in computer system 100, offsetting the increase in power used by cooling fan 106 and resulting in a lower power usage by computer system 100. At the optimum fan speed, the power used by computer system 100 may increase if the speed of cooling fan 106 is increased or decreased.

In some embodiments, power utilization control mechanism 110 reduces the speed of cooling fan 106 by changing a parameter related to the fan speed, including but not limited to a current drawn by cooling fan 106, a power used by cooling fan 106, a fan pulse width modulation percentage of cooling fan 106, or any other parameter related to the speed of cooling fan 106.

In some embodiments, power utilization control mechanism 110 changes the fan speed or the parameter related to the fan speed by an amount based on the relationship between the power used by computer system 100 and the fan speed, or based on the relationship between the power used by computer system 100 and a parameter related to the fan speed. In some embodiments, the change in the fan speed is related to a first derivative of the power used by computer system 100 with respect to the fan speed or with respect to the parameter related to fan speed. In some embodiments, power utilization control mechanism 110 uses a gradient descent technique to determine changes to the fan speed or changes to the parameter related to fan speed, based on the relationship between the power used by computer system 100 and the fan speed or the parameter related to fan speed.

In some embodiments, power utilization control mechanism 110 monitors the temperature of one or more devices in computer system 100, including but not limited to processor 102, memory 104, and/or other chips and integrated circuits. In some embodiments, power utilization control mechanism 110 monitors the temperature of devices in computer system 100 using an apparatus or method described in U.S. Pat. No. 7,020,802, or by inferring the temperature of the device based on parameters of computer system 100, or any other suitable apparatus or method. In some of these embodiments, power utilization control mechanism 110 prevents the temperature of a monitored device from going above a level predetermined for each monitored device. In some embodiments, the predetermined temperature level for each device is based on factors including a maximum operating temperature for the device, a relationship between the temperature of the device and the reliability of the device, or any other parameter of a device that may be impacted by the temperature of the device.

In some embodiments, power utilization control mechanism 110 increases the speed of cooling fan 106 by a predetermined amount based on the relationship between the power used by computer system 100 and the speed of cooling fan 106 in order to achieve the desired predetermined relationship between the power utilization of computer system 100 and the fan speed.

In some embodiments, while power utilization control mechanism 110 implements the process described above, the load on processor 102 is maintained at a predetermined level. In other embodiments, power utilization control mechanism 110 implements the process described above to determine a fan speed for a set of processor load levels and the fan speed determined for each processor load level is stored. In some embodiments, the fan speed for cooling fan 106 is determined based on the load level on processor 102 and the stored fan speeds for the set of processor load levels.

In some embodiments, the decreased fan speed resulting from the operation of power utilization control mechanism 110 results in a reduction in the sound and/or vibration generated by cooling fan 106.

Figure 2:
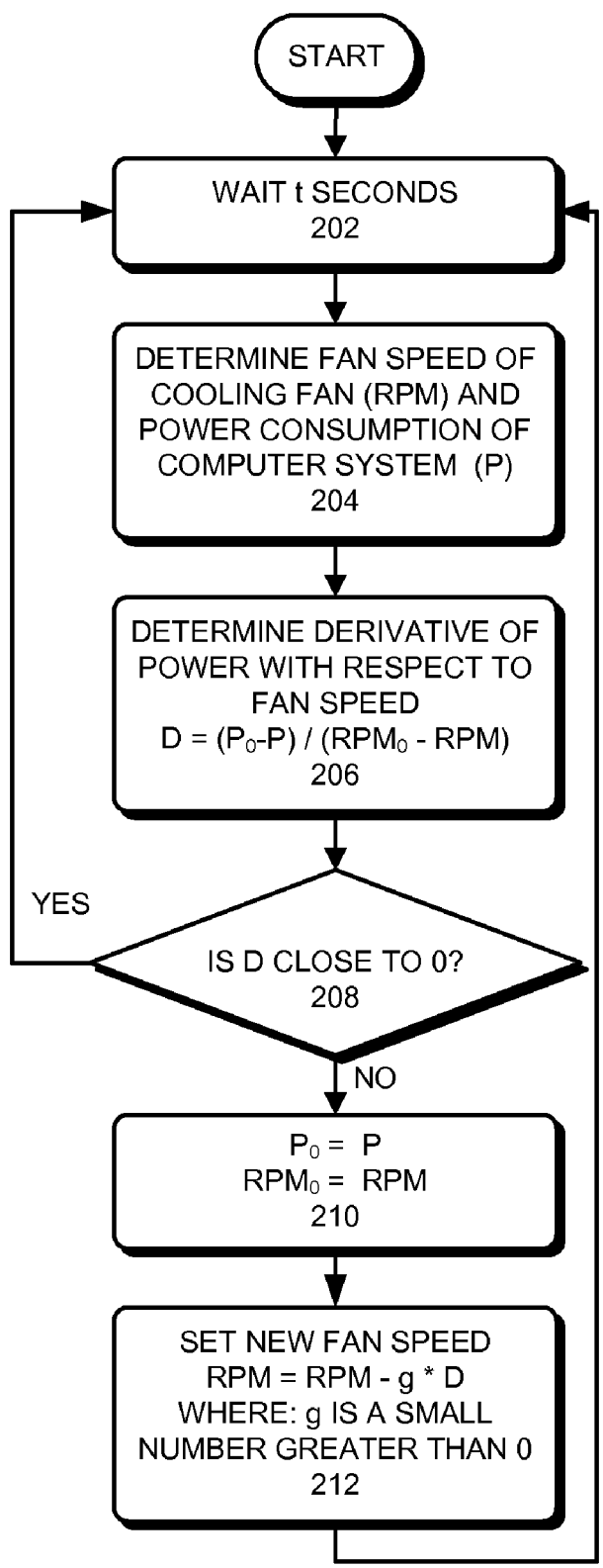
FIG. 2 presents a flowchart illustrating a process for controlling a power utilization of a computer system by adjusting a cooling fan speed in accordance with some embodiments of the present invention.

FIG. 2 presents a flowchart illustrating a process for controlling a power utilization of a computer system by adjusting a cooling fan speed in accordance with some embodiments of the present invention. First the process waits a predetermined time t (step 202). Next, the fan speed of the cooling fan in the computer system, and the power consumption of the computer system are determined (step 204). Then, the derivative of the power consumption of the computer system with respect to the speed of the cooling fan is determined (step 206). If the derivative is within a predetermined amount of zero (step 208), then the process returns to step 202. If the derivative is not within a predetermined amount of zero, then the power consumption of the computer system and the speed of the fan are stored (step 210). The cooling fan is then set to a new speed by reducing the current fan speed by a small predetermined amount multiplied by the derivative (step 212). The process then returns to step 202. In some embodiments, if the derivative of the power consumption of the computer system with respect to the speed of the cooling fan is negative, then the speed of the cooling fan is increased by a small predetermined amount in step 212.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for controlling a power utilization of a computer system by adjusting a cooling fan speed, the method comprising:
   determining a relationship between information related to the cooling fan speed and the power utilization, wherein determining the relationship comprises determining at least one change in the power utilization for a change in the cooling fan speed; and
   adjusting the cooling fan speed based on the determined relationship to control the power utilization of the computer system.

2. The method of claim 1, wherein:
   adjusting the cooling fan speed based on the determined relationship includes maintaining a constant cooling fan speed when the determined relationship is within a predetermined range.

3. The method of claim 1, wherein:
   adjusting the cooling fan speed based on the determined relationship includes using a gradient descent technique to determine how to optimize the cooling fan speed.

4. The method of claim 1, wherein determining the relationship between the information related to the cooling fan speed and the power utilization includes estimating a power utilization of the computer system by inferring the power utilization from instrumentation signals.

5. The method of claim 4, wherein inferring the power utilization from instrumentation signals includes inferring the power utilization from an inferential power model generated during a training phase.

6. The method of claim 1, wherein determining the relationship between the information related to the cooling fan speed and the power utilization includes generating a dynamic trace of power utilization for the computer system based on dynamic traces of currents and associated voltages for individual components within the computer system.

7. The method of claim 1, further comprising:
measuring a temperature of a component in the computer system; and
adjusting the cooling fan speed based on the temperature of the component in relation to a predetermined temperature.

8. The method of claim 1, wherein:
a load on a processor in the computer system is constant.

9. The method of claim 1,
wherein determining the relationship between the information related to the cooling fan speed and the power utilization includes systematically monitoring and recording a set of performance parameters of the computer system; and
wherein the recording process keeps track of the temporal relationships between events in different performance parameters.

10. A computer-readable storage medium storing instructions that when executed by a computer cause the computer to perform a method for controlling a power utilization of a computer system by adjusting a cooling fan speed, the method comprising:
determining a relationship between information related to the cooling fan speed and the power utilization, wherein determining the relationship comprises determining at least one change in the power utilization for a change in the cooling fan speed; and
adjusting the cooling fan speed based on the determined relationship to control the power utilization of the computer system.

11. The computer-readable storage medium of claim 10, wherein:
adjusting the cooling fan speed based on the determined relationship includes maintaining a constant cooling fan speed when the determined relationship is within a predetermined range.

12. The computer-readable storage medium of claim 10, wherein:
adjusting the cooling fan speed based on the determined relationship includes using a gradient descent technique to determine how to optimize the cooling fan speed.

13. The computer-readable storage medium of claim 10, wherein determining the relationship between the information related to the cooling fan speed and the power utilization includes estimating a power utilization of the computer system by inferring the power utilization from instrumentation signals.

14. The computer-readable storage medium of claim 13, wherein inferring the power utilization from instrumentation signals includes inferring the power utilization from an inferential power model generated during a training phase.

15. The computer-readable storage medium of claim 10, wherein determining the relationship between the information related to the cooling fan speed and the power utilization includes generating a dynamic trace of power utilization for the computer system based on dynamic traces of currents and associated voltages for individual components within the computer system.

16. The computer-readable storage medium of claim 10, further comprising:
measuring a temperature of a component in the computer system; and
adjusting the cooling fan speed based on the temperature of the component in relation to a predetermined temperature.

17. The computer-readable storage medium of claim 10, wherein:
a load on a processor in the computer system is constant.

18. The computer-readable storage medium of claim 10,
wherein determining the relationship between the information related to the cooling fan speed and the power utilization includes systematically monitoring and recording a set of performance parameters of the computer system; and
wherein the recording process keeps track of the temporal relationships between events in different performance parameters.

19. An apparatus that controls a power utilization of a computer system by adjusting a cooling fan speed, the apparatus comprising:
a determining mechanism configured to determine a relationship between information related to the cooling fan speed and the power utilization, wherein while determining the relationship the determining mechanism determines at least one change in the power utilization for a change in the cooling fan speed; and
an adjusting mechanism configured to adjust the cooling fan speed based on the determined relationship to control the power utilization of the computer system.

20. The apparatus of claim 19,
wherein the determining mechanism includes a mechanism configured to systematically monitor and record a set of performance parameters of the computer system; and
wherein the recording process keeps track of the temporal relationships between events in different performance parameters.

* * * * *